(12) United States Patent
Nakamura et al.

(10) Patent No.: US 10,202,151 B1
(45) Date of Patent: Feb. 12, 2019

(54) SIDE-BY-SIDE VEHICLE

(71) Applicant: KAWASAKI JUKOGYO KABUSHIKI KAISHA, Kobe-shi, Hyogo (JP)

(72) Inventors: Kenta Nakamura, Kobe (JP); Takashi Hisamura, Akashi (JP); Itsuo Takegami, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 15/928,990

(22) Filed: Mar. 22, 2018

(51) Int. Cl.
| | |
|---|---|
| B62D 33/02 | (2006.01) |
| B62D 33/023 | (2006.01) |
| B62D 25/12 | (2006.01) |
| B60K 5/02 | (2006.01) |
| F02M 35/16 | (2006.01) |
| B60R 16/04 | (2006.01) |
| B60K 1/04 | (2006.01) |

(52) U.S. Cl.
CPC .............. B62D 25/12 (2013.01); B60K 5/02 (2013.01); B60R 16/04 (2013.01); F02M 35/162 (2013.01); B60K 2001/0416 (2013.01)

(58) Field of Classification Search
CPC ............ B60N 2/36; B62D 33/02; B60P 3/423
See application file for complete search history.

(56) References Cited

U.S. PATENT DOCUMENTS

| | | | | |
|---|---|---|---|---|
| 7,287,769 | B2* | 10/2007 | Thiemke | B62D 21/11 180/312 |
| 8,167,351 | B2* | 5/2012 | Plowman | B60N 2/305 296/69 |
| 8,534,747 | B2* | 9/2013 | Thurmon | B60N 2/24 296/182.1 |
| 8,613,336 | B2 | 12/2013 | Deckard et al. | |
| 9,211,924 | B2* | 12/2015 | Safranski | B60G 3/14 |
| 2004/0031639 | A1* | 2/2004 | Deves | B62D 33/03 180/311 |
| 2004/0195018 | A1* | 10/2004 | Inui | B62D 3/12 180/68.1 |
| 2004/0195019 | A1* | 10/2004 | Kato | B60K 13/02 180/68.3 |
| 2004/0195034 | A1* | 10/2004 | Kato | B60K 17/34 180/312 |
| 2004/0231900 | A1* | 11/2004 | Tanaka | B60K 13/02 180/68.3 |

(Continued)

Primary Examiner — Bryan A Evans
(74) Attorney, Agent, or Firm — Alleman Hall Creasman & Tuttle LLP

(57) ABSTRACT

A cargo carrier having a depressed loading space includes a base carrier member, and a pair of right and left side carrier members disposed on right and left sides, respectively, of the base carrier member, and fastened to the pair of right and left rear frame members, respectively, from above. The base carrier member includes a bottom wall portion forming a bottom surface of the loading space, a front wall portion protruding upward from a front end of the bottom wall portion, and a pair of right and left side wall portions protruding upward from a right end and a left end, respectively, of the bottom wall portion. The pair of right and left side wall portions of the base carrier member are removably mountable on the pair of right and left side carrier members, respectively.

7 Claims, 10 Drawing Sheets

(56) References Cited

U.S. PATENT DOCUMENTS

| | | | |
|---|---|---|---|
| 2012/0031694 A1* | 2/2012 | Deckard | B60K 17/08 180/68.3 |
| 2016/0280145 A1* | 9/2016 | Vertanen | B60P 3/40 |
| 2018/0170218 A1* | 6/2018 | Nowland | B60N 2/80 |

* cited by examiner

SIDE-BY-SIDE VEHICLE

BACKGROUND OF THE INVENTION

Field of the Invention

The present invention relates to a side-by-side vehicle including a cargo carrier.

Description of the Related Art

For example, U.S. Pat. No. 8,613,336 discloses a side-by-side vehicle of a four-wheel-drive type which travels off-road. This vehicle includes a riding space in which a driver seat and a passenger seat are provided, and which is surrounded by a cabin frame, a cargo carrier (cargo carrying portion) disposed rearward of the riding space, an engine, a CVT, and others which are disposed below the cargo carrier. An opening is provided in a portion of a floor portion (bottom wall portion) of the cargo carrier. This opening is closed by a detachable cover. In a case where maintenance for the engine, the CVT and others is performed, the cover is detached (removed) to allow a user to access the engine, the CVT and others through the opening provided in the floor portion of the cargo carrier.

However, in this configuration, a separation line formed between the cargo carrier and the cover is present in the floor portion (bottom wall portion) of the cargo carrier. Liquid such as rain water accumulated in a loading space of the cargo carrier flows into the separation line and then into a space in which the engine, the CVT, and others are disposed, through the separation line.

SUMMARY OF THE INVENTION

In view of the above-described circumstances, an object of the present invention is to allow a user to more easily perform a maintenance work for a driving power unit or the like disposed below a cargo carrier, and to prevent ingress of liquid from the cargo carrier into a space in which the driving power unit or the like is disposed.

According to an aspect of the present invention, a side-by-side vehicle comprises a vehicle body frame including a cabin frame section surrounding a riding space in which seats for a driver and a passenger are provided, and a pair of right and left rear frame sections disposed rearward of the cabin frame section; a driving power unit supported by the vehicle body frame; and a cargo carrier which is disposed above the driving power unit in a state in which the cargo carrier is supported by the vehicle body frame, and has a loading space with a depressed shape. The cargo carrier includes a base carrier member, and a pair of right and left side carrier members disposed on right and left sides, respectively, of the base carrier member and fastened to the pair of right and left rear frame sections, respectively, from above. The base carrier member includes a bottom wall portion forming a bottom surface of the loading space, a front wall portion protruding upward from a front end of the bottom wall portion, and a pair of right and left side wall portions protruding upward from a right end and a left end, respectively, of the bottom wall portion in such a manner that the pair of right and left side wall portions are lower than the front wall portion. The pair of right and left side wall portions of the base carrier member are removably mountable on the pair of right and left side carrier members, respectively.

In accordance with the above-described configuration, the cargo carrier has a separable structure, and a user can easily access the driving power unit or the like without excessively disassembling a vehicle body by detaching the base carrier member in a state in which the side carrier members are mounted on the rear frame sections, during maintenance. Since the base carrier member includes the bottom wall portion, the front wall portion, and the pair of right and left side wall portions, and a separation line of the cargo carrier is not formed on the bottom surface of the loading space, liquid accumulated in the loading space of the cargo carrier is not likely to reach the separation line. In addition, since a separation line between the base carrier member and each of the side carrier members is formed in a surface extending vertically rather than a horizontal surface, ingress of the liquid from an upper side into this separation line is not likely to occur. In this way, the maintenance work can be more easily performed because of the separable structure of the cargo carrier, and ingress of the liquid through the separation line into a space in which the driving power unit is disposed does not occur.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, the embodiment of the present invention will be described with reference to the drawings.

Figure 1:
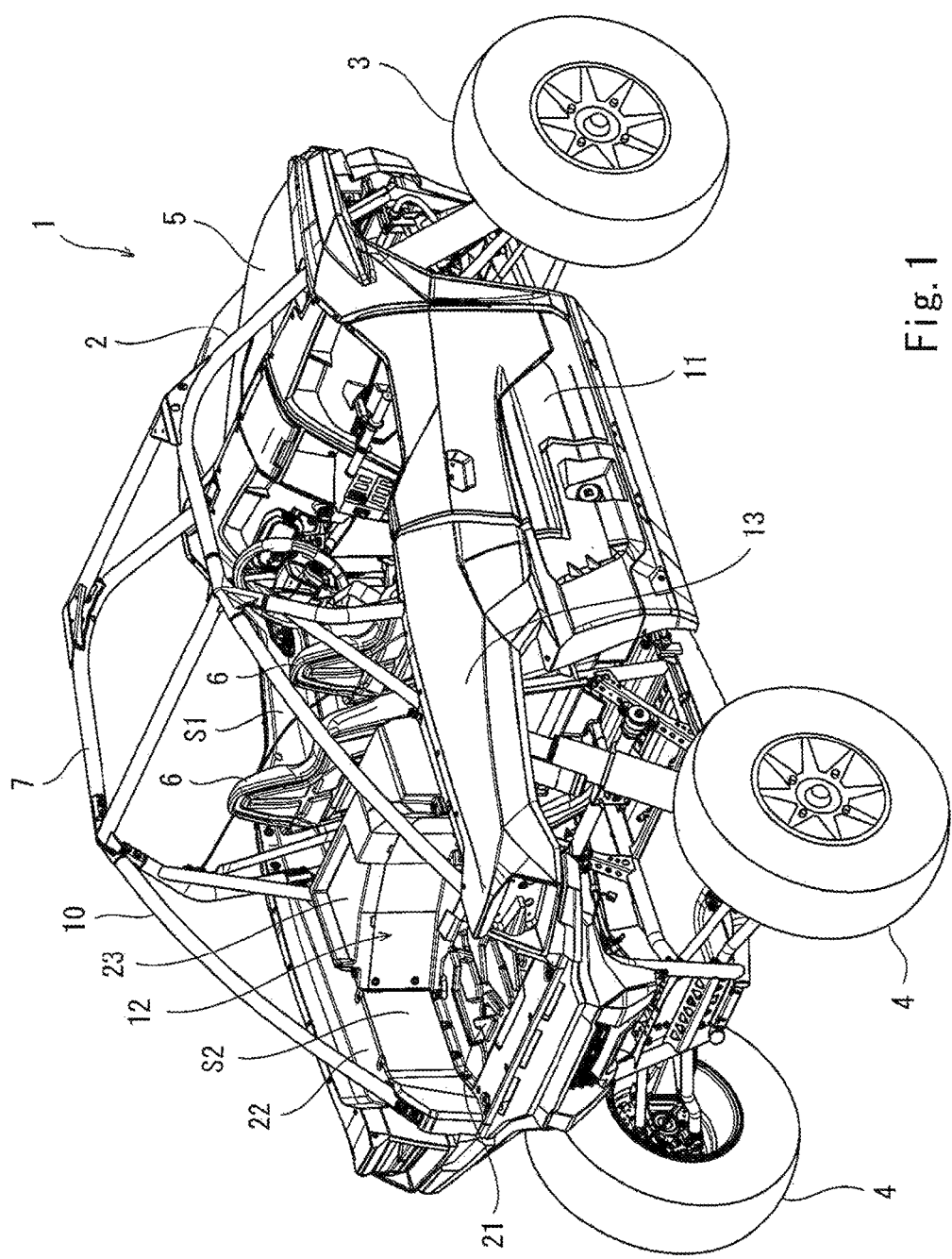
FIG. 1 is a perspective view showing a side-by-side vehicle (vehicle) according to one embodiment.
Figure 2:
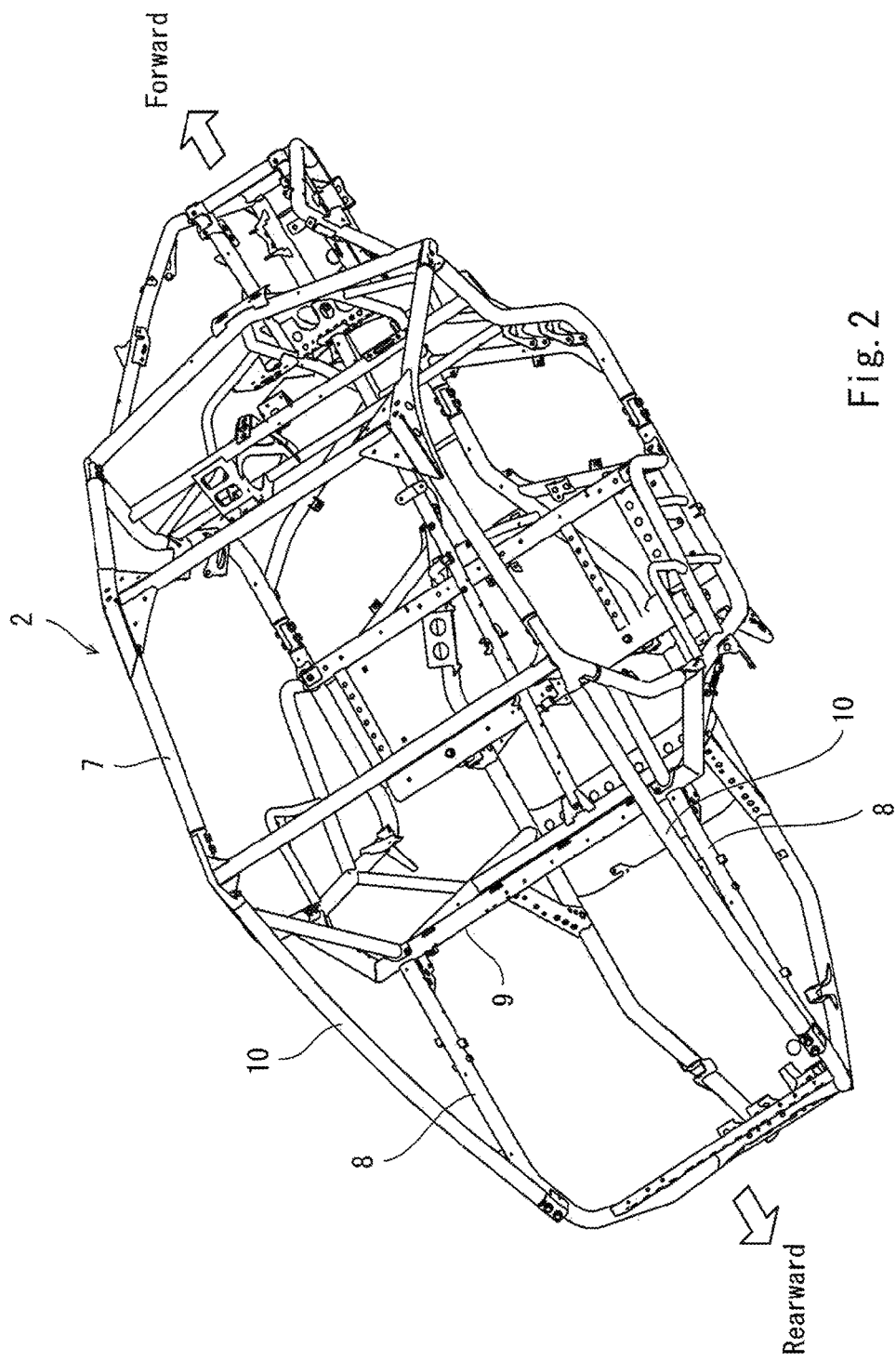
FIG. 2 is a perspective view showing a frame structure of the vehicle of FIG. 1.
Figure 3:
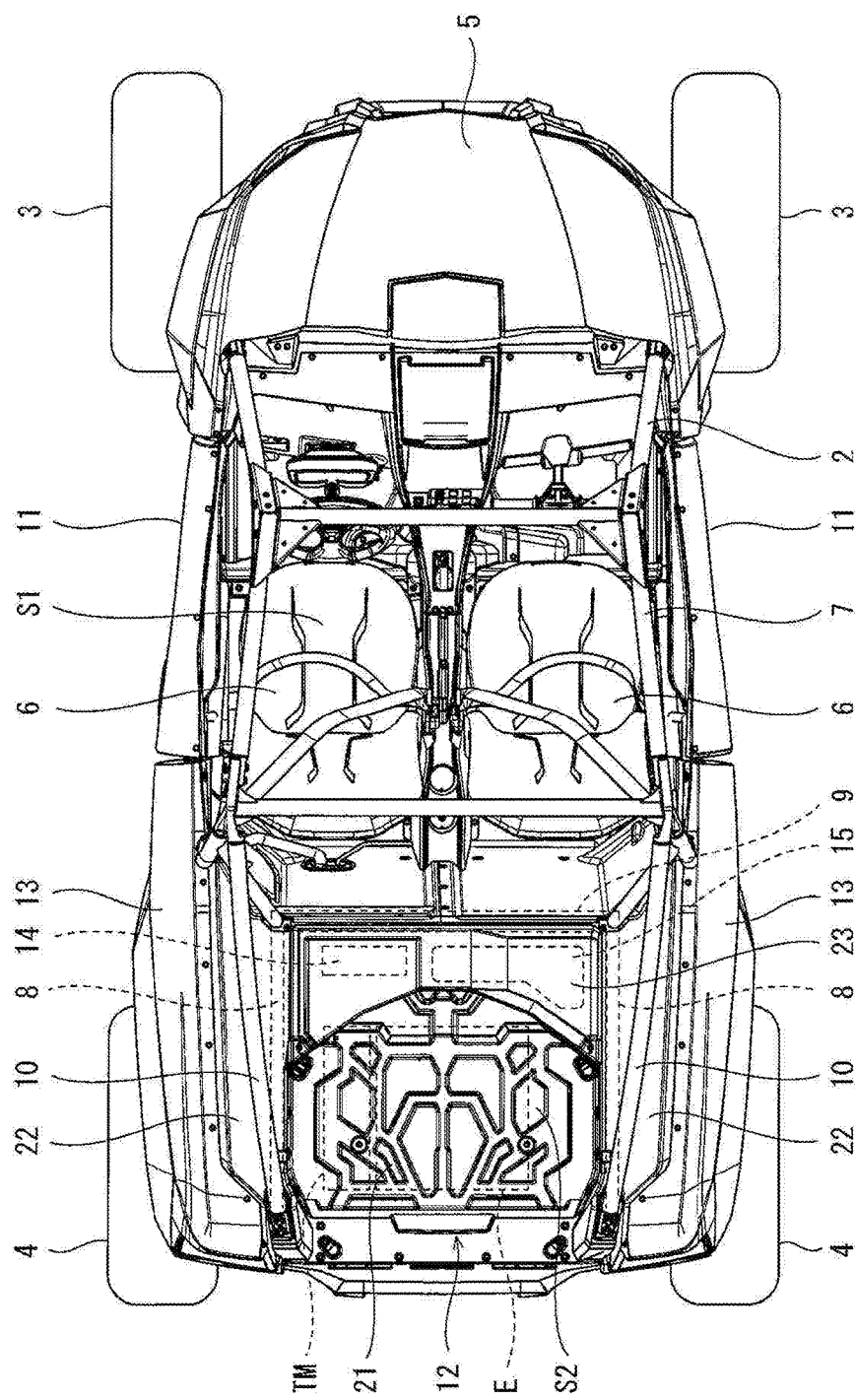
FIG. 3 is a plan view showing the vehicle of FIG. 1, when viewed from above.

FIG. 1 is a perspective view showing a side-by-side vehicle 1 (hereinafter will be simply referred to as the vehicle 1) according to one embodiment. FIG. 2 is a perspective view showing a frame structure of the vehicle 1 of FIG. 1. FIG. 3 is a plan view showing the vehicle 1 of FIG. 1, when viewed from above. Referring now to FIGS. 1 and 3, the vehicle 1 includes a pair of right and left front wheels 3 supported by (mounted on) the front portion of a vehicle body frame 2, and a pair of right and left rear wheels 4 supported by the rear portion of the vehicle body frame 2. A space formed between the right and left front wheels 3 is covered by a resin-made hood 5 from above. A pair of seats 6 (a driver seat and a passenger seat) are arranged side by side, at a location that is rearward of the hood 5, and is in the vicinity of the center of the vehicle body frame 2 in a forward and rearward direction.

As shown in FIGS. 1 to 3, the vehicle body frame 2 includes, for example, a cabin frame section 7, a pair of right and left rear frame sections 8, a cross frame section 9, and a pair of right and left rear gusset frame sections 10. The vehicle body frame 2 is a pipe frame including a plurality of pipe members coupled to each other. The cabin frame section 7 is disposed to surround a riding space S1 in which the seats 6 are provided The pair of right and left rear frame sections 8 are disposed on right and left sides at a location that is rearward of the cabin frame section 7, and extend rearward. The cross frame section 9 is disposed rearward of the cabin frame section 7 and couples the front end portions of the pair of right and left rear frame sections 8 to each other. The pair of right and left rear gusset frame sections 10 couple the upper portions of the cabin frame section 7 to the rear portions of the pair of right and left rear frame sections 8, respectively.

Resin-made doors 11 are disposed on right and left sides of the seats 6 to allow a rider and a passenger to get into and out of the vehicle 1. A resin-made cargo carrier 12 is disposed behind the seats 6 and has a loading space S2 with a depressed (recessed) shape. A pair of right and left rear fenders 13 which are made of a resin are disposed on right and left sides of the cargo carrier 12 at a location that is above the rear wheels 4. The front ends of the rear fenders 13 are close to and face the rear ends of the doors 11, respectively. The outer surfaces of the rear fenders 13 in the vehicle width direction are coplanar with the outer surfaces of the doors 11 in the vehicle width direction, respectively.

The cargo carrier 12 includes a base carrier member 21, a pair of right and left side carrier members 22, and a front carrier member 23. In other words, the cargo carrier 4 has a separable structure including four members which are separably joined to each other. The base carrier member 21 mainly forms the bottom surface and front surface of the loading space S. The pair of right and left side carrier members 22 are disposed on right and left sides of the base carrier member 21 and mainly form the side surfaces of the loading space S2. The front carrier member 23 is disposed in front of the base carrier member 21 and mainly forms the upper portion of the front surface of the loading space S2.

The base carrier member 21 covers from above an engine (driving power unit) E and a continuously variable transmission (CVT) TM which are supported by (mounted on) the vehicle body frame 2. The side carrier members 22 cover the rear frame sections 8 from above and are fastened to the rear frame sections 8, respectively. Openings 22e are formed in the rear portions of the side carrier members 22, respectively, to expose the rear portions of the rear frame sections 8. The rear portions of the rear gusset frame sections 10 extend through the openings 22e of the side carrier members 22 and are fastened to the rear portions of the rear frame sections 8, respectively. A battery 14 and an air cleaner box 15 are disposed in front of the base carrier member 21. The battery 14 is an electric power supply for in-vehicle devices. The air cleaner box 15 serves to clean air (intake air) to be supplied to the engine E. The battery 14 and the air cleaner box 15 are arranged side by side in a rightward and leftward direction. The battery 14 and the air cleaner box 15 are covered by the front carrier member 23 from above. The side carrier members 22 extend in the forward and rearward direction from a location corresponding to the front end of the front carrier member 23 to a location corresponding to the rear end of the base carrier member 21.

Figure 4:
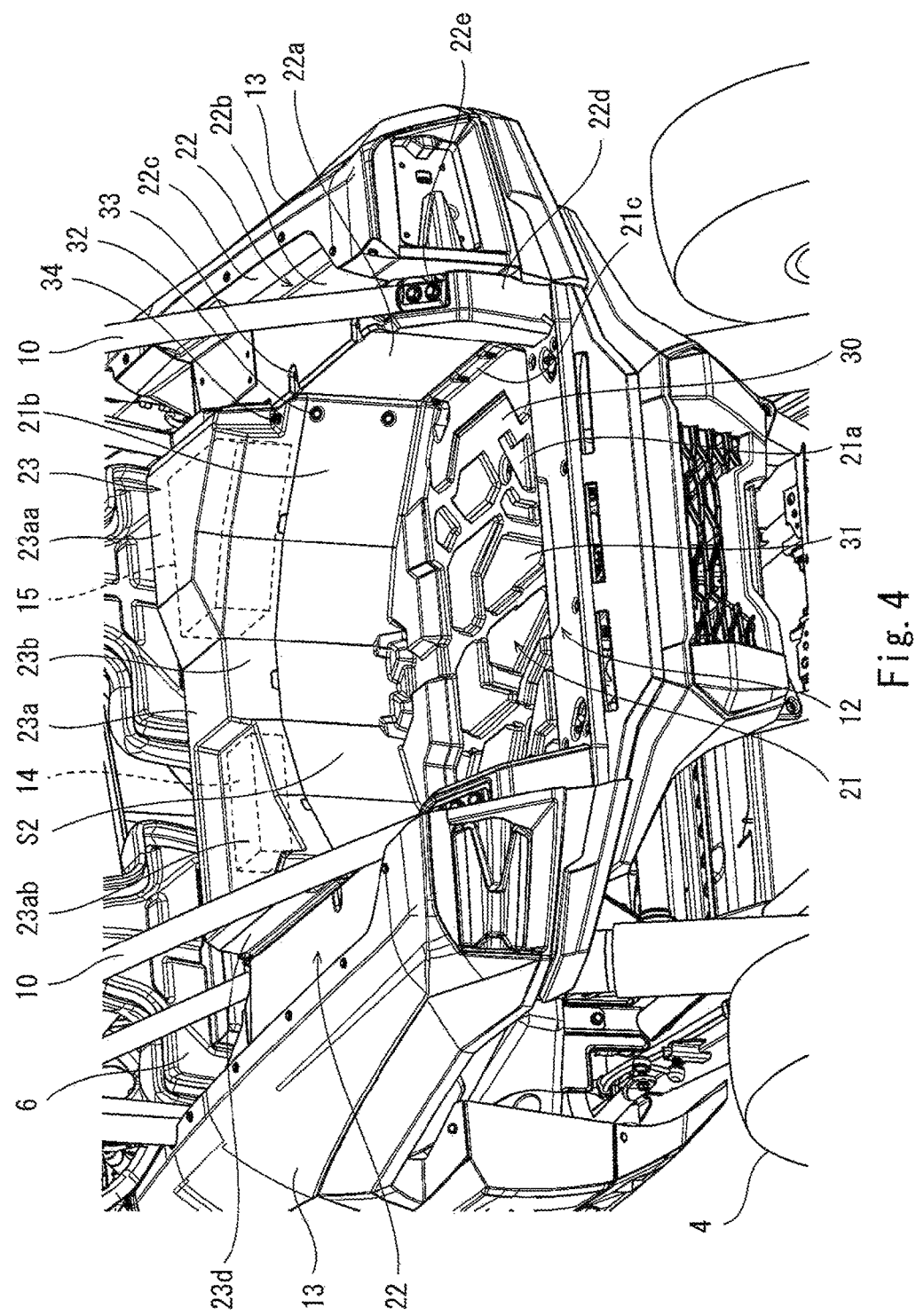
FIG. 4 is a perspective view showing a cargo carrier of the vehicle of FIG. 1.

FIG. 4 is a perspective view showing the cargo carrier 12 of the vehicle 1 of FIG. 1. As shown in FIG. 4, the cargo carrier 12 has the loading space S2 defined by the bottom surface, the front surface, the left side surface and the right side surface, by joining the base carrier member 21, the pair of right and left side carrier members 22, and the front carrier member 23 to each other. The loading space S2 opens upward and rearward. The base carrier member 21, the pair of right and left side carrier members 22, and the front carrier member 23 are fastened to the vehicle body frame 2 (or brackets mounted on the vehicle body frame 2) by fastening members 32 to 34 such as rivets.

The base carrier member 21 includes a bottom wall portion 21a, a front wall portion 21b, and a pair of right and left side wall portions 21c. The bottom wall portion 21a is the bottom surface of the loading space S2. The bottom wall portion 21a has a concave/convex structure including a depressed (recessed) region 30, and a plurality of convex (protruding) portions 31 protruding from the depressed region 30 in such a manner that the plurality of convex portions 31 are spaced apart from each other. This concave/convex structure is provided in most of the bottom wall portion 21a including a center. The front wall portion 21b protrudes upward from the front end of the bottom wall portion 21a. When viewed from above (in a plan view) (see FIG. 3), the front wall portion 21b has a shape in which it protrudes forward, as a whole. More specifically, when viewed from above, the front wall portion 21b has a substantially circular-arc shape. The pair of right and left side wall portions 21c protrude upward from the right end and left end, respectively, of the bottom wall portion 21a. The upper ends of the pair of right and left side wall portions 21c are lower than the upper end of the front wall portion 21b. The height of the pair of right and left side wall portions 21c is, for example, 5 to 50%, preferably, 10 to 30% of the height of the front wall portion 21b. The front ends of the pair of right and left side wall portions 21c are connected to the lower portion of the front wall portion 21b.

Each of the pair of right and left side carrier members 22 includes a side wall portion 22a, an upper wall portion 22b, an outer end wall portion 22c, and a rear wall portion 22d. The lower end portion of each of the side wall portions 22a is connected to the upper end portion of the side wall portion 21c of the base carrier member 21 and forms the side surface of the loading space S2. The upper wall portion 22b protrudes outward in the vehicle width direction (rightward and leftward direction) from the upper end of the side wall portion 22a. The upper surface of the upper wall portion 22b is a horizontal surface. The outer end wall portion 22c protrudes upward from the outer end of the upper wall portion 22b in the vehicle width direction. The upper end of the outer end wall portion 22c is connected to the rear fender 13. The rear wall portion 22d is connected to the rear end of the side wall portion 22a and the rear end of the upper wall portion 22*b*. Each of the pair of right and left side carrier members 22 (the upper wall portion 22*b* and/or the rear wall portion 22*d*) is formed with an opening 22*e* for allowing the rear portion of the rear gusset frame section 10 (see FIG. 1) to be coupled to the rear portion of the rear frame section 8.

The front carrier member 23 includes an upper wall portion 23*a*, a rear wall portion 23*b*, a front wall portion 23*c*, and a pair of right and left side wall portions 23*d*. The front carrier member 23 extends in the rightward and leftward direction, from a location corresponding to the left end of the base carrier member 21 to a location corresponding to the right end of the base carrier member 21, on a front side of the base carrier member 21. The upper wall portion 23*a* is disposed above the battery 14 and the air cleaner box 15. The upper end of the air cleaner box 15 is higher than the upper end of the battery 14. In this structure, a region (namely, right section 23*aa*) of the upper wall portion 23*a* which is right (immediately)above the air cleaner box 15 is higher than a region (left section 23*ab*) of the upper wall portion 23*a* which is right above the battery 14.

The rear wall portion 23*b* of the front carrier member 23 protrudes downward from the rear end of the upper wall portion 23*a*. When viewed from above (in a plan view), the rear wall portion 23*b* has a shape in which it protrudes forward, as a whole. Specifically, when viewed from above, the rear wall portion 23*b* has a substantially circular-arc shape. The rear wall portion 23*b* of the front carrier member 23 is coplanar (flush) with the front wall portion 21*b* of the base carrier member 21, and is connected to the upper end portion of the front wall portion 21*b* of the base carrier member 21. In this structure, the rear wall portion 23*b* of the front carrier member 23 and the front wall portion 21*b* of the base carrier member 21 define the front surface of the loading space S2. The front wall portion 23*c* of the front carrier member 23 protrudes downward from the front end of the upper wall portion 23*a* (see FIG. 6). The pair of right and left side wall portions 23*d* protrude downward from the right end and left end, respectively, of the upper wall portion 23*a*, and are connected to the rear wall portion 23*b* and the front wall portion 23*c*. The rear surface of the air cleaner box 15 has a shape (e.g., circular-arc shape) conforming to that of the rear wall portion 23*b* of the front carrier member 23.

Figure 5:
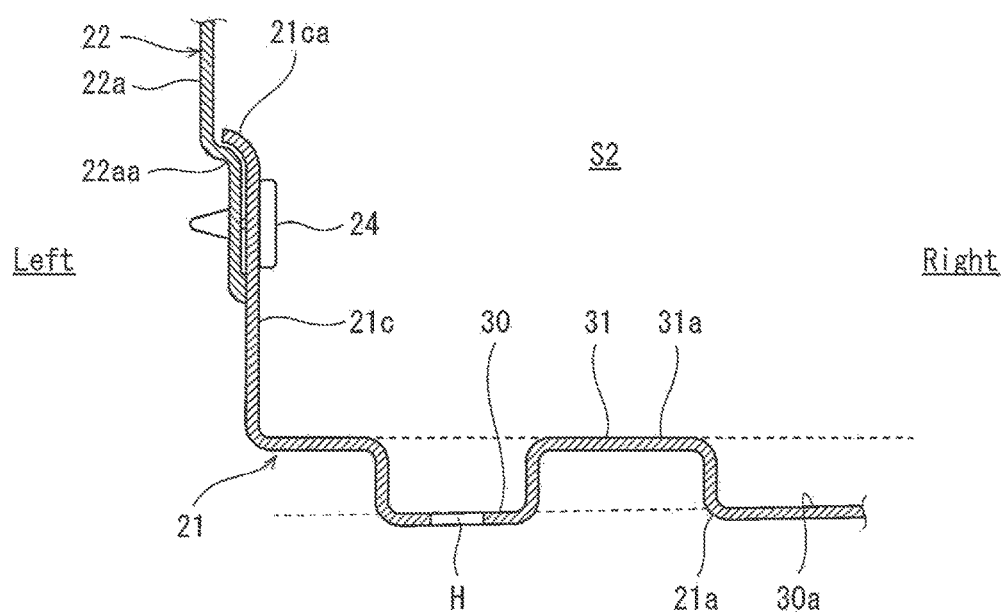
FIG. 5 is a cross-sectional view showing a fastening portion at which a base carrier member and a side carrier member of the cargo carrier of FIG. 3 are fastened to each other, and a region which is in the vicinity of the fastening portion.

FIG. 5 is a cross-sectional view showing a fastening portion at which the base carrier member 21 and the side carrier member 22 of the cargo carrier of FIG. 3 are fastened to each other, and a region which is in the vicinity of the fastening portion. As shown in FIG. 5, each of the pair of right and left side wall portions 21*c* of the base carrier member 21 is removably fastened to the side wall portion 22*a* of the side carrier member 22 by a fastening member 24 such as a rivet, in a state in which the side wall portion 21*c* is lapped on the side wall portion 22*c* from the loading space S2 side. The lower end portion of the side wall portion 22*a* of the side carrier member 22 is formed with a stepped portion 22*aa* protruding toward the loading space S2. The upper end portion of the side wall portion 21*c* of the base carrier member 21 is formed with a curved portion 21*ca* protruding away from the loading space S2 in such a manner that the curved portion 21*ca* conforms in shape to the stepped portion 22*aa*. In this structure, the base carrier member 21 can be easily aligned with each of the side carrier members 22. In addition, the base carrier member 21 can be easily dismounted (detached) from each of the side carrier members 22.

As described above, the bottom wall portion 21*a* of the base carrier member 21 has the concave/convex structure. The depressed region 30 of the bottom wall portion 21*a* is formed with a drain hole H at a location that is apart from the engine E in the rightward and leftward direction, in a plan view. In the present embodiment, the drain hole H is provided at a location that is in front of and lateral of the engine E(rightward or leftward of the engine E) in a plan view. The bottom surface 30*a* of the depressed region 30 is an inclined surface which is slightly inclined toward the drain hole H. In contrast, the upper surfaces 31*a* of the plurality of convex portions 31 are horizontal surfaces arranged on the same plane. Therefore, the bottom surface 30*a* of the depressed region 30 and the upper surfaces 31*a* of the convex portions 31 are not parallel to each other. Although the depressed region 30 is apparently partitioned by the convex portions 31, in the example of FIG. 5, the plurality of convex portions 31 are actually arranged like lands, and thus the depressed region 30 has a labyrinth structure as shown in FIG. 4.

Figure 6:
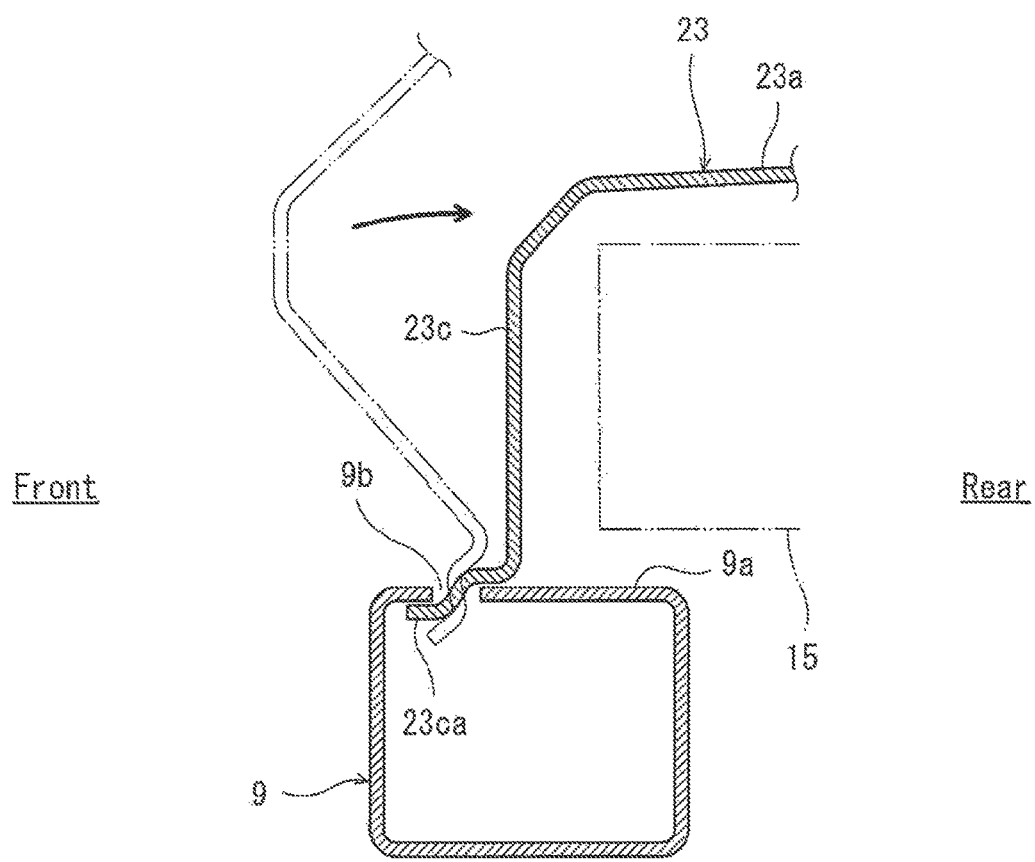
FIG. 6 is a cross-sectional view showing an engagement portion at which a front carrier member and a cross frame section are engaged with each other, and a region which is in the vicinity of the engagement portion, when viewed from the side (in a side view).
Figure 7:
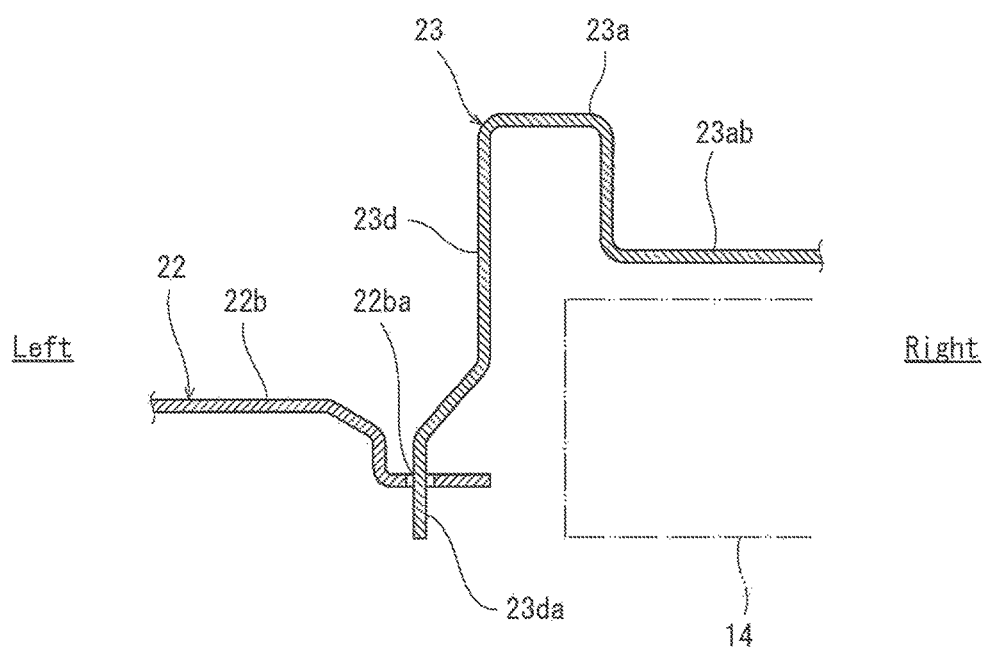
FIG. 7 is a cross-sectional view showing an engagement portion at which the front carrier member and the side carrier member are engaged with each other, and a region which is in the vicinity of the engagement portion when viewed from the rear (in a rear view).
Figure 8:
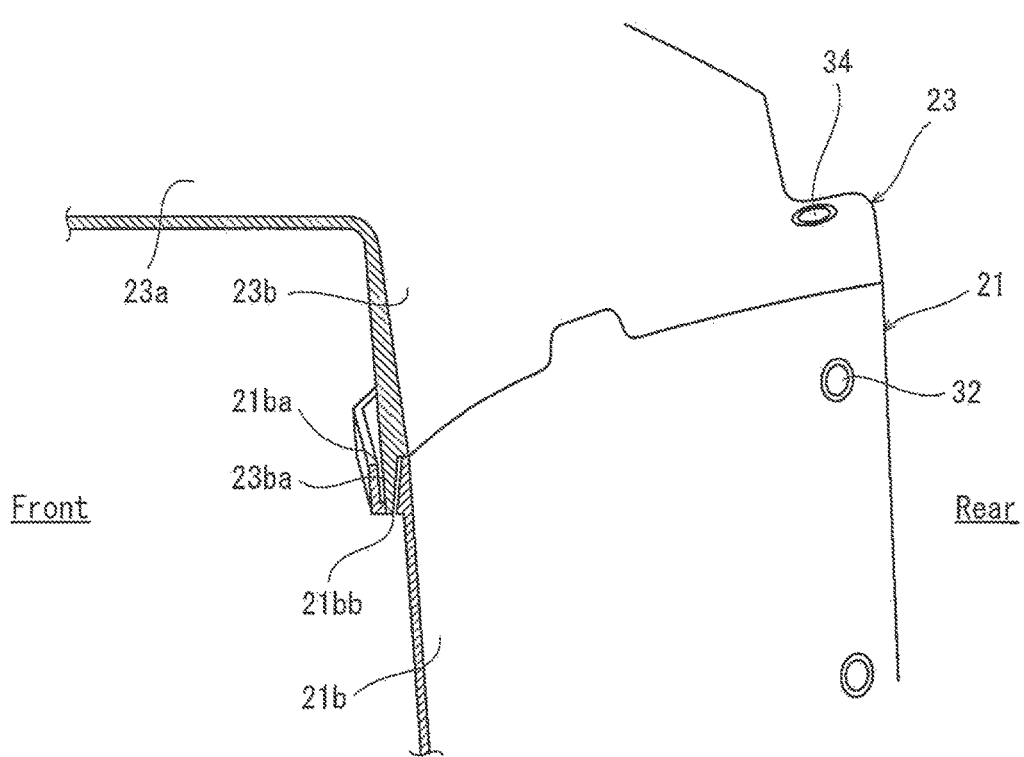
FIG. 8 is a cross-sectional perspective view showing an engagement portion at which the front carrier member and the base carrier member are engaged with each other, and a region which is in the vicinity of the engagement portion, when viewed from the side (in a side view).

FIG. 6 is a cross-sectional view showing an engagement portion at which the front carrier member 23 and the cross frame section 9 are engaged with each other, and a region which is in the vicinity of the engagement portion, when viewed from the side (in a side view). FIG. 7 is a cross-sectional view showing an engagement portion at which the front carrier member 23 and the side carrier member 22 are engaged with each other, and a region which is in the vicinity of the engagement portion, when viewed from the rear (in a rear view). FIG. 8 is a cross-sectional perspective view showing an engagement portion at which the front carrier member 23 and the base carrier member 21 are engaged with each other, and a region which is in the vicinity of the engagement portion, when viewed from the side. As shown in FIG. 6, the cross frame section 9 is a rectangular pipe, and an upper plate portion 9*a* of the cross frame section 9 is formed with a slit 9*b* (engaged portion). The slit 9*b* is located at a distance from the front end of the upper plate portion 9*a*.

An engagement portion 23*ca* protruding forward is formed in the lower end portion of the front wall portion 23*c* of the front carrier member 23. In a case where the front carrier member 23 is mounted on the cross frame section 9, the front carrier member 23 is tilted forward, then the engagement portion 23*ca* of the front carrier member 23 is inserted into the slit 9*b* of the cross frame section 9 (see two-dotted line of FIG. 6), and then the front carrier member 23 is tilted backward (rearward). In this way, the engagement portion 23*ca* of the front carrier member 23 is engaged with the cross frame section 9 while preventing the engagement portion 23*ca* from being disengaged from the slit 9*b*.

As shown in FIG. 7, a slit 22*ba* is formed in a portion of the upper wall portion 22*b* of the side carrier member 22, the portion corresponding to the side wall portion 23*d* of the front carrier member 23. An engagement portion 23*da* protruding downward is formed in the lower end portion of the side wall portion 23*d* of the front carrier member 23. This engagement portion 23*da* is inserted into the slit 22*ba* of the side carrier member 22, and thus the front carrier member 23 is positioned with respect to each of the side carrier members 22.

As shown in FIG. 8, a groove 21*ba* which opens upward is formed in the upper end portion of the front wall portion 21*b* of the base carrier member 21. A tapered engagement portion 23*ba* with a dimension reduced in the downward direction protrudes downward from the lower end portion of the rear wall portion 23*b* of the front carrier member 23. This engagement portion 23*ba* is inserted into the groove 21*ba* from above, and thus the front carrier member 23 is positioned with respect to the base carrier member 21. An engaged hole 21*bb* is formed on the bottom surface of the groove 21*ba*. The tapered engagement portion 23*ba* protruding downward from the lower end portion of the rear wall portion 23*b* of the front carrier member 23 is inserted into the engaged hole 21*bb*. In this way, the front carrier member 23 is precisely positioned with respect to the base carrier member 21. In this state, the rear surface of the rear wall portion 23*b* of the front carrier member 23 and the rear surface of the front wall portion 21*b* of the base carrier member 21 are coplanar with each other.

In the above-described manner, the front carrier member 23 is engaged with the cross frame section 9, the base carrier member 21, and the side carrier members 22. Portions of the front carrier member 23 which are close to the vehicle body frame 2 are fastened to the vehicle body frame 2 (or the brackets fastened to the vehicle body frame 2) by fastening members 34. Portions of the base carrier member 21 which are close to the vehicle body frame 2 are fastened to the vehicle body frame 2 (or the brackets fastened to the vehicle body frame 2) by fastening members 32.

Figure 9:
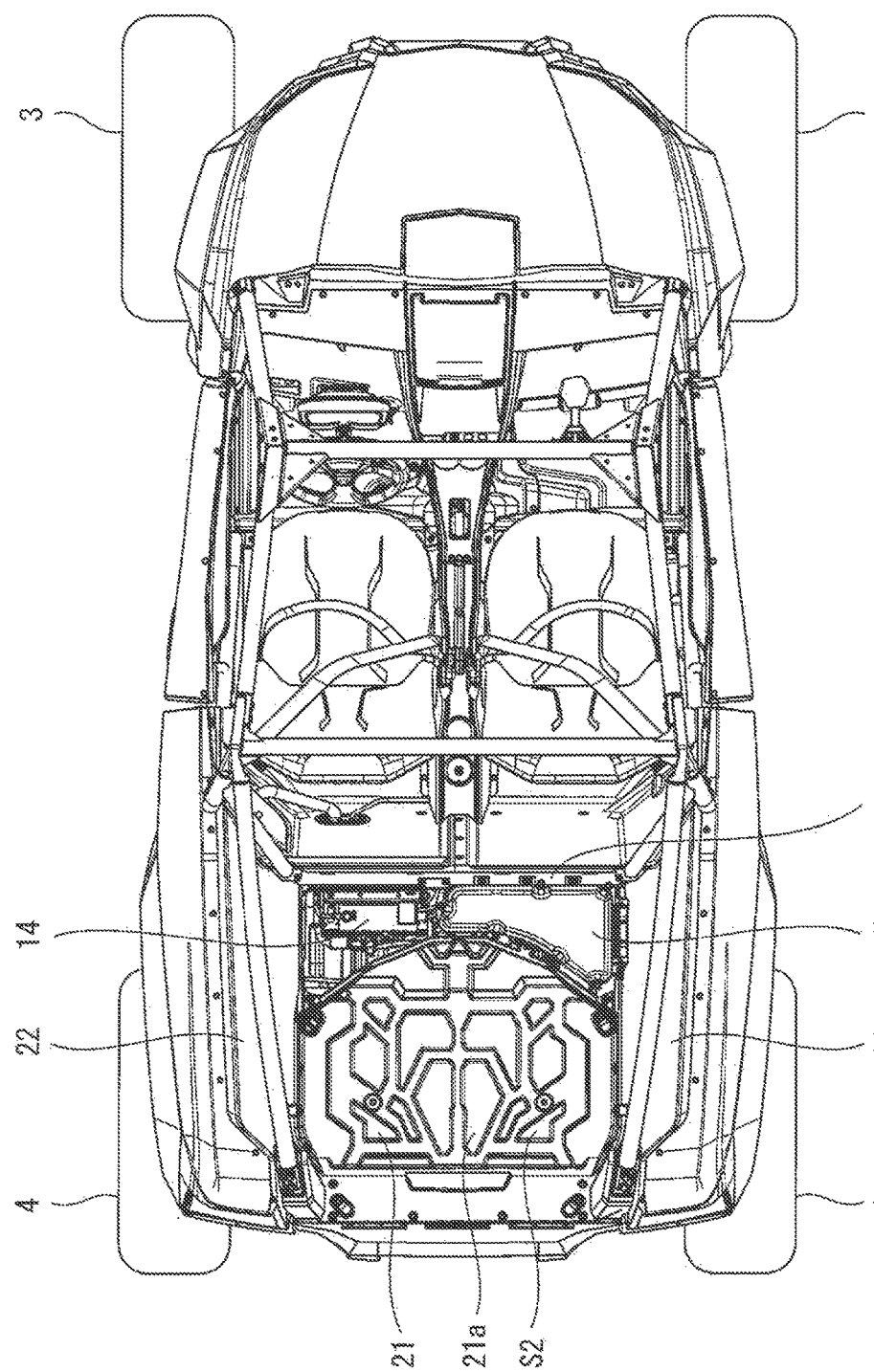
FIG. 9 is a plan view showing a state in which the front carrier member of the vehicle of FIG. 3 is detached.

Next, a maintenance work performed for the vehicle 1 will be described. FIG. 9 is a plan view showing a state in which the front carrier member 23 of the vehicle 1 of FIG. 3 is detached. As shown in FIG. 9, by detaching the front carrier member 23, the battery 14 and the air cleaner box 15 are exposed. In this state, change (exchange) of the battery 14, change of a filter element of the air cleaner box 15, connection of accessory members to the terminals of the battery 14, or the like can be performed. In other words, by merely detaching the front carrier member 23, a user can access the battery 14 and the air cleaner box 15 without disassembling the whole of the cargo carrier 12. The user can perform the maintenance work for the battery 14 or the air cleaner box 15 in a state in which the user gets on the base carrier member 21.

Figure 10:
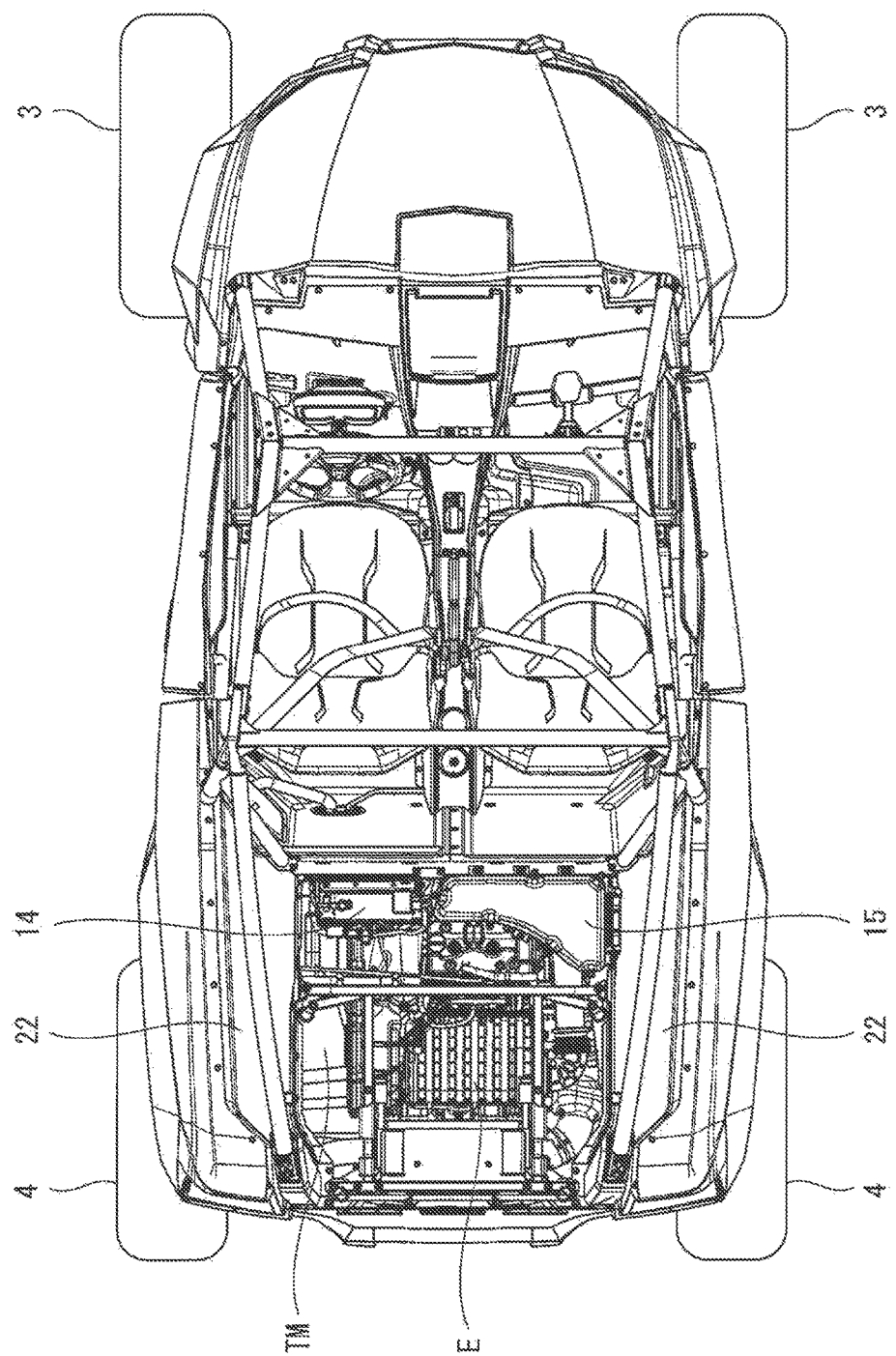
FIG. 10 is a plan view showing a state in which the front carrier member and the base carrier member of the vehicle of FIG. 3 are detached.

FIG. 10 is a plan view showing a state in which the front carrier member 23 and the base carrier member 21 of the vehicle 1 of FIG. 9 are detached. As shown in FIG. 10, by detaching the base carrier member 21 after the front carrier member 23 is detached, the engine E and the CVT TM are exposed. In this state, change (exchange) of a belt of the CVT TM, adjustment of a valve inside a cylinder head cover of the engine E, or the like can be performed. In brief, by detaching the front carrier member 23 and the base carrier member 21 in a state in which the right and left side carrier members 22 are mounted on the right and left rear frame sections 8, respectively, the user can easily access the engine E and the CVT TM without a need to excessively perform a disassembling (dismounting) work.

In the vehicle 1 in which strength of the vehicle body frame 2 is increased by use of the rear gusset frame sections 10, it is necessary to dismount the rear gusset frame sections 10 if the side carrier members 22 should be detached. However, during the maintenance work, it is not necessary to detach the side carrier members 22. As a result, strength of the frame can be increased and the maintenance work can be easily performed.

The base carrier member 21 includes the bottom wall portion 21*a*, the front wall portion 21*b*, and the pair of right and left side wall portions 21*c*, and a separation line of the cargo carrier 12 is not formed in the bottom surface of the loading space S2. In this structure, liquid accumulated in the loading space S2 of the cargo carrier 12 does not easily reach the separation line. A separation line formed between the base carrier member 21 and the side carrier member 22 is formed in the side surface extending vertically rather than a horizontal surface. In this structure, ingress of the liquid into the separation line due to a hydraulic head pressure is not likely to occur. Therefore, the maintenance work can be more easily performed because of the separable structure of the cargo carrier 12, and it becomes possible to prevent ingress of the liquid through the separation line into the space in which the engine E is disposed.

Each of the pair of right and left side wall portions 21*c* of the base carrier member 21 is fastened to the side wall portion 22*a* of corresponding one of the side carrier members 22 in a state in which the side wall portion 21*c* is lapped on the side wall portion 22*a* from the loading space S2 side. Therefore, the base carrier member 21 can be easily detached from the loading space S2 side while maintaining a state in which the side carrier members 22 are fastened to the vehicle body frame 2.

The rear wall portion 23*b* of the front carrier member 23 is mounted on the front wall portion 21*b* of the base carrier member 21, the pair of right and left side wall portions 23*d* of the front carrier member 23 are mounted on the pair of right and left side carrier members 22, respectively, and the separation line of the cargo carrier 12 is not formed in the wall (the upper wall portion 23*a* of the front carrier member 23) of the cargo carrier 12 which is located above the battery 14 and the air cleaner box 15. In this structure, it becomes possible to prevent a situation in which the liquid accumulated in the upper surface of the front carrier member 23 flows through the separation line into the space in which the battery 14 and the air cleaner box 15 are disposed. Further, since the separation line between the rear wall portion 23*b* of the front carrier member 23 and the front wall portion 21*b* of the base carrier member 21 is formed in the surface extending vertically, ingress of the liquid into this separation line due to the hydraulic head pressure is not likely to occur. In this way, ingress of the liquid through the separation line into the space does not occur.

Since the engagement portion 23*ca* provided in the front wall portion 23*c* of the front carrier member 23 is engaged with the cross frame section 9, the front carrier member 23 can be stably supported by the vehicle body frame 2, the front carrier member 23 can be easily removably (detachably) mounted, and the maintenance for the battery 14 and the air cleaner box 15 can be easily performed.

The upper surfaces 31*a* of the plurality of convex portions 31 of the bottom wall portion 21*a* of the base carrier member 21 are horizontal surfaces which are on the same plane, and the bottom surface 30*a* of the depressed (recessed) region 30 of the bottom wall portion 21*a* of the base carrier member 21 is the inclined surface inclined toward the drain hole H. In this structure, stuff (e.g, spare tire) loaded in the loading space S can be horizontally supported on the upper surfaces 31*a* of the plurality of convex portions 31 in the concave/convex structure of the bottom wall portion 21*a* of the base carrier member 21, and the liquid accumulated in the depressed region 30 can be smoothly discharged through the drain hole H.

The front surface (the front wall portion 21*b* and the rear wall portion 23*b*) of the loading space S2 of the cargo carrier 12 has a shape (circular-arc shape) in which it protrudes forward as a whole. Because of this shape, the battery 14 and the air cleaner box 15 can be disposed in front of the loading space S2, and the spare tire and the like of the vehicle 1 can be disposed in the loading space S2. In this way, high space efficiency can be realized.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention. For example, although the cargo carrier 12 includes the four members which are separable from each other, the cargo carrier 12 may include five or more members which are separable from each other. Further, although the vehicle 1 includes the engine E which is an internal combustion engine as the driving power unit which generates the driving power for allowing the vehicle 1 to travel, the vehicle 1 may include an electric motor instead of the engine E.

The invention claimed is:

1. A side-by-side vehicle comprising:
a vehicle body frame including a cabin frame section surrounding a riding space in which seats for a driver and a passenger are provided, and a pair of right and left rear frame sections disposed rearward of the cabin frame section;
a driving power unit supported by the vehicle body frame; and
a cargo carrier which is disposed above the driving power unit in a state in which the cargo carrier is supported by the vehicle body frame, and has a loading space with a depressed shape,
wherein the cargo carrier includes a base carrier member, and a pair of right and left side carrier members disposed on right and left sides, respectively, of the base carrier member and fastened to the pair of right and left rear frame sections, respectively, from above,
wherein the base carrier member includes a bottom wall portion forming a bottom surface of the loading space, a front wall portion protruding upward from a front end of the bottom wall portion, and a pair of right and left side wall portions protruding upward from a right end and a left end, respectively, of the bottom wall portion, and
wherein the pair of right and left side wall portions of the base carrier member are removably mountable on the pair of right and left side carrier members, respectively.

2. The side-by-side vehicle according to claim 1, wherein the pair of right and left side wall portions of the base carrier member are removably fastened to the pair of right and left side wall portions of the pair of right and left side carrier members, respectively, in a state in which the pair of right and left side wall portions of the base carrier member are lapped on the pair of right and left side wall portions of the pair of right and left side carrier members, respectively, from the loading space side.

3. The side-by-side vehicle according to claim 1, wherein the pair of right and left side carrier members include a pair of right and left side wall portions, respectively, forming side surfaces of the loading space,
wherein upper ends of the pair of right and left side wall portions of the base carrier member are lower than an upper end of the front wall portion of the base carrier member, and
wherein the pair of right and left side wall portions of the base carrier member are removably mountable on the pair of right and left side wall portions of the pair of right and left side carrier members, respectively.

4. The side-by-side vehicle according to claim 1, further comprising:
a battery and an air cleaner box which are disposed in front of the base carrier member,
wherein the cargo carrier further includes a front carrier member covering the battery and the air cleaner box from above,
wherein the front carrier member includes an upper wall portion disposed above the battery and the air cleaner box, a rear wall portion protruding downward from a rear end of the upper wall portion and forming a front surface of the loading space, and a pair of right and left side wall portions protruding downward from a right end and a left end, respectively, of the upper wall portion,
wherein the rear wall portion of the front carrier member is removably mountable on the front wall portion of the base carrier member, and
wherein the pair of right and left side wall portions of the front carrier member are removably mountable on the pair of right and left side carrier members, respectively.

5. The side-by-side vehicle according to claim 4, further comprising:
wherein the vehicle body frame includes a cross frame section disposed rearward of the cabin frame section and connecting front end portions of the pair of right and left rear frame sections to each other,
wherein the front carrier member further includes a front wall portion protruding downward from a front end of the upper wall portion, and
wherein the front wall portion of the front carrier member includes an engagement portion which is engageable with an engaged portion formed in the cross frame section.

6. The side-by-side vehicle according to claim 1,
wherein the bottom wall portion of the base carrier member includes a depressed region formed with a drain hole, and a plurality of convex portions protruding upward from the depressed region in such a manner that the plurality of convex portions are spaced apart from each other,
wherein upper surfaces of the plurality of convex portions are horizontal surfaces, respectively, which are on a same plane, and
wherein a bottom surface of the depressed region is an inclined surface which is inclined toward the drain hole.

7. The side-by-side vehicle according to claim 1,
wherein the vehicle body frame further includes a pair of right and left rear gusset frame sections coupling upper portions of the cabin frame section to rear portions of the pair of right and left rear frame sections, respectively,
wherein the pair of right and left side carrier members have openings, respectively, to expose the rear portions of the pair of right and left rear frame sections, and
wherein the pair of right and left rear gusset frame sections are fastened to the rear portions of the pair of right and left rear frame sections, respectively, through the openings of the pair of right and left side carrier members.

* * * * *